Feb. 24, 1953 F. MALEK 2,629,231
MILK CHUTE REFRIGERATOR
Filed March 5, 1949
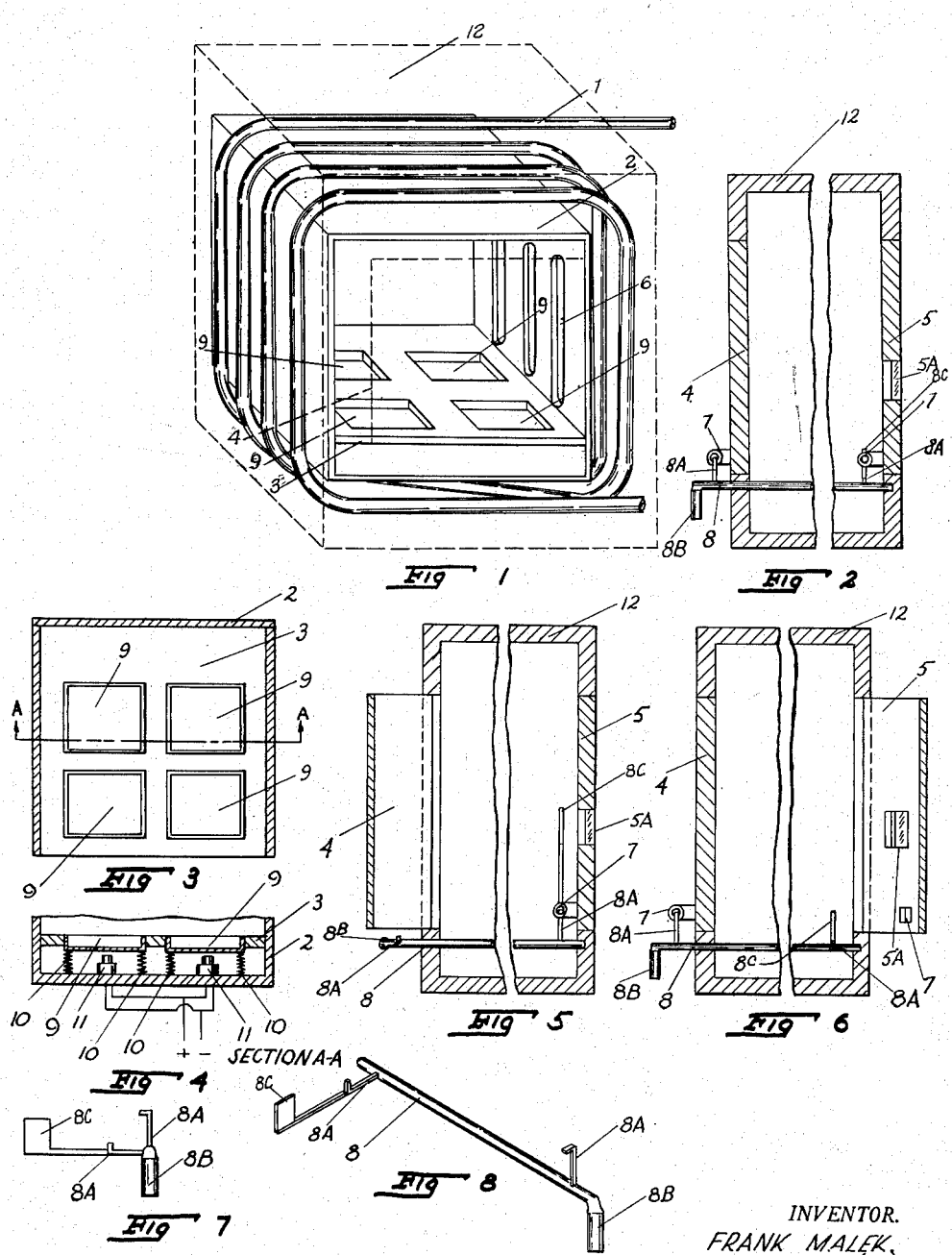
INVENTOR.
FRANK MALEK.
BY David H. Eckroad.
Attorney.

Patented Feb. 24, 1953

2,629,231

UNITED STATES PATENT OFFICE 2,629,231

MILK CHUTE REFRIGERATOR

Frank Malek, Shaker Heights, Ohio

Application March 5, 1949, Serial No. 79,748

1 Claim. (Cl. 62—99)

My invention relates to new and useful improvements in refrigerators and particularly to one for use for milk deliveries.

The principal object of this invention is to provide a device in the form of a refrigerator for use in place of a conventional milk chute in making deliveries of milk to houses, or to other places having similar deliveries.

Another object of the invention is to provide a refrigerator of the kind described that can be easily installed in a home in place of the regular milk chute to receive milk deliveries and means to keep such milk at a safe temperature to preserve its freshness until such milk is removed from the device such temperature automatically regulated by means of a "thermostat" conveniently located near such device and connected therewith.

Another object of the invention is to provide a refrigerator as described with means to advise milk deliverymen when delivery of milk is not needed.

Another object of the device is to provide a refrigerator of the kind described in which the weight of a filled milk bottle will be sufficient to close an electrical circuit leading to a refrigerator means (not shown) which is connected to the device and which will operate to provide the desired temperature within the device, such temperature being automatically regulated by a "thermostatic means—not shown."

Other objects of this invention and the use of same will become apparent from a reading of the description and a reference to the accompanying drawings, in which:

Figure 1 is a view in elevation of the inside of the device with the refrigerating means, and having the inclosure indicated.

Fig. 2, is a side sectional view in elevation of the device.

Fig. 3, is a view of the bottom of the invention looking at it from the top with the enclosing walls cut away.

Fig. 4, is a cross sectional view of the bottom portion of the invention as viewed on line AA shown in Fig. 3.

Fig. 5 is a cross-sectional view in elevation of a segment of the device.

Fig. 6 is a cross-sectional view in elevation of the opposite side of the refrigerating member.

Figs. 7 and 8, show the means attached to a rod for retaining the doors in a closed position.

Referring in detail to the drawings: A is the complete invention shown with the interior unit 2 enclosed, 3 is the top portion of the bottom part, 4 is the inside door of the device and 5 the outside door, or the door that opens for the delivery of milk in the device. 6 are air vents in the sides of the inside unit 2, 7 are sockets, or receptacles to receive the prongs 8A to retain a door in a closed position, the prongs 8A are attached to a horizontal rod 8, with handle 8B, one of prongs 8A is extended to provide for a flag or signal, 8C which is adapted to show through a window 5A in the side of the door 5, when the rod 8 is operated to bring the prong 8A in contact with 7 to close the door 5, and thus inform the driver not to deliver any milk that day, 9 are plates forming a part of the sub-floor 3 and supported by the coil springs 10, such springs being adapted to compress downward when a full milk bottle is placed on any of such sections or plates, allowing such plate or section to drop downward until it contacts 11 and completes an electrical circuit through the positive and negative wires leading to an electrical refrigerating unit. The continuous tube or pipe 1 has its ends A connected with a refrigeration unit remotely located relative to the device.

This invention or device is designed and constructed for use particularly in homes in place of the ordinary chute or receptacle for milk as it is delivered by a milk deliveryman. The device, as will be noted from the description, may be constructed to hold any number of bottles of milk, the weight of one full bottle will operate the refrigerating unit while the placing of empty bottles on said bottom sections of the device for pick-up by the deliveryman will not operate the refrigerating unit, hence the refrigerating unit will operate only when at least one full bottle of milk, or other liquid, is on one of the sub-bottom sections of the interior unit.

The device is provided with two enclosing doors, the outside door 5, and the inside door 4, such doors being operated by the rod 8 with handle 8B which extends along one side of the inside unit 2, perferably between the wall of 2 and 12 where the rod 8 is operated so that the hook 8A is brought in contact with 7 in door 5 such door is locked in its closed position and the signal 8C shows through the window 5A in door 5 indicating to the deliveryman not to service the device, when door 5 is closed, door 4 will be open so that the device can be used from the inside. When the rod 8 is operated so that the hook 8A comes in contact with 7 on door 4, such door is locked and closed in a locked position and door 5 is unlocked so that a deliveryman may service the device.

The device may be constructed of any kind of desirable material suitable for such purpose and with a capacity to meet the demands or requirements of the purchaser or user.

I have described and shown my invention in a convenient and useful form and structure, however adaptations in its use may require modification in form or structure, or both, without departing from the basic features or spirit of the invention.

Having described my invention and the manner of its use, I claim:

A device of the character described comprising a unit of box-like form and having the opposite ends thereof open, the lower wall of that unit forming the base and having a floor member disposed above said base in a plane parallel with the base, said floor having a number of rectangular openings of uniform size and equally spaced apart therein, a member movably supported within each of said openings by means of spiral springs disposed between said members and said base, said springs adapted to be compressed downwardly by reason of a weight placed on said member, electrical contact means said members when pressed downwardly being adapted to operate the last mentioned means for closing an electrical circuit, said unit disposed within an inclosing means of similar form and having insulated walls, coils consisting of an endless pipe disposed around the said unit between same and the said walls, door hingedly attached on the ends of the said inclosing means and adapted to close said ends and provide means of access to said unit, said doors maintained in a closed position by means of a horizontal rod extending between the opposite walls of said inclosing means and movably supported in said walls, one end of said rod extending outwardly from one of said walls to provide a handle means for operating said rod, and the outer of said doors provided with a window through which a signal operated by the said rod may be viewed.

FRANK MALEK.

REFERENCES CITED

The following references are of record in the file of this patent:

UNITED STATES PATENTS

| Number | Name | Date |
|---|---|---|
| 1,851,535 | Baldwin | Mar. 29, 1932 |
| 2,013,172 | Petrone | Sept. 3, 1935 |
| 2,199,301 | Bonnefoy | Apr. 30, 1940 |
| 2,201,411 | Smith | May 21, 1940 |